(12) United States Patent
Lemans

(10) Patent No.: US 10,696,501 B2
(45) Date of Patent: Jun. 30, 2020

(54) ALIGNING RAMP FOR ALIGNING A SHIPPING CONTAINER LOADED ON A VEHICLE, AND COMBINATION OF A SHIPPING CONTAINER LOADED ON A VEHICLE AND THE ALIGNING RAMP

(71) Applicant: Leemans Waste Centre B.V., Almelo (NL)

(72) Inventor: Arjan Bert Leendert Lemans, Vriezenveen (NL)

(73) Assignee: Leemans Waste Centre B.V., Almelo (NL)

( * ) Notice: Subject to any disclaimer, the term of this patent is extended or adjusted under 35 U.S.C. 154(b) by 0 days.

(21) Appl. No.: 15/999,794

(22) PCT Filed: Feb. 7, 2017

(86) PCT No.: PCT/EP2017/052647
§ 371 (c)(1),
(2) Date: Aug. 17, 2018

(87) PCT Pub. No.: WO2017/140533
PCT Pub. Date: Aug. 24, 2017

(65) Prior Publication Data
US 2019/0210819 A1 Jul. 11, 2019

(30) Foreign Application Priority Data
Feb. 19, 2016 (EP) .................................... 16156596

(51) Int. Cl.
*B65G 69/00* (2006.01)

(52) U.S. Cl.
CPC .... *B65G 69/006* (2013.01); *B65G 2201/0235* (2013.01)

(58) Field of Classification Search
CPC ..................................................... B65G 69/006
USPC ............................................................ 414/396
See application file for complete search history.

(56) References Cited

U.S. PATENT DOCUMENTS

| 2,711,835 | A | * | 6/1955 | Kappen | .................. | B65G 67/20 |
|           |   |   |        |        |                  | 414/401    |
| 7,699,575 | B2 |   | 4/2010 | Frankel |                  |            |
| 2011/0027060 | A1 |   | 2/2011 | Dunn et al. |              |            |
| 2011/0182705 | A1 |   | 7/2011 | Bushong |                 |            |

FOREIGN PATENT DOCUMENTS

| AU | 474696 | 7/1976 |
| EP | 1321398 A1 | 6/2003 |
| GB | 2451631 A | 2/2009 |
| WO | 2007149443 A2 | 12/2007 |

* cited by examiner

*Primary Examiner* — Mark C Hageman
(74) *Attorney, Agent, or Firm* — The Webb Law Firm

(57) ABSTRACT

The invention relates to an aligning ramp for aligning a shipping container loaded on a vehicle, the aligning ramp including: a support structure; guiding means supported by the support structure above a base plane, which guiding means includes at least two guides arranged parallel and at a distance from each other, wherein each guide diverges relative to the base plane from a first position to a second position; an elongate carriage, wherein each end of the elongate carriage is guided by a guide of the guiding means; and connecting means arranged in longitudinal direction at a central position to the elongate carriage.

14 Claims, 6 Drawing Sheets

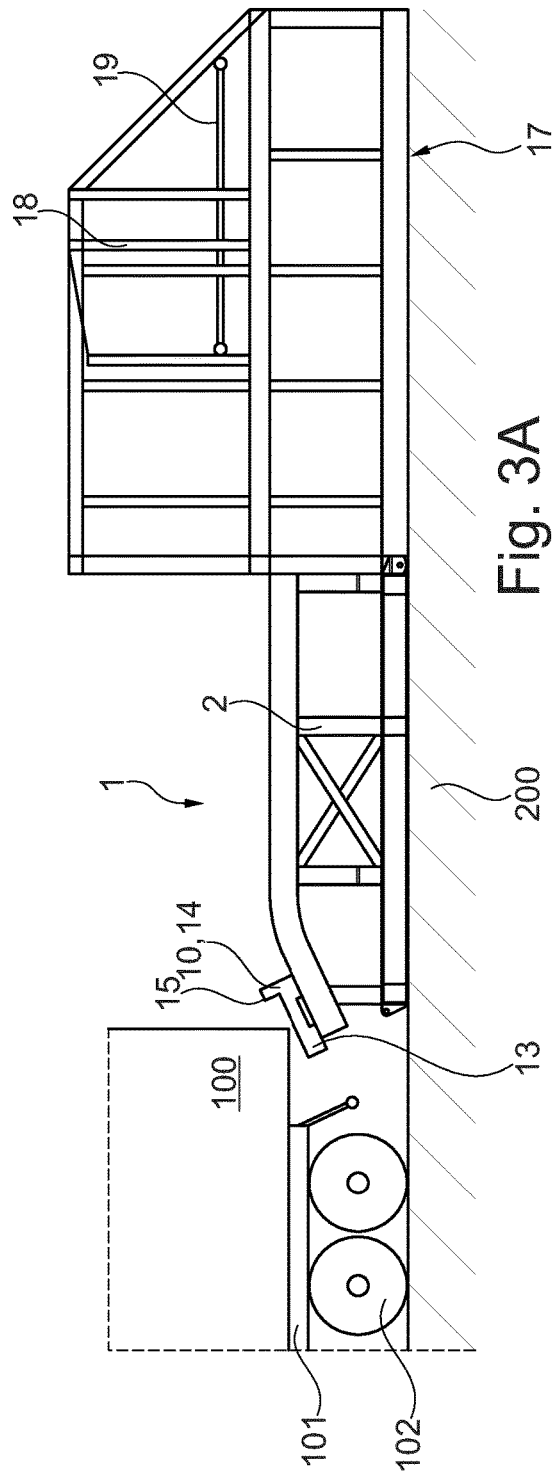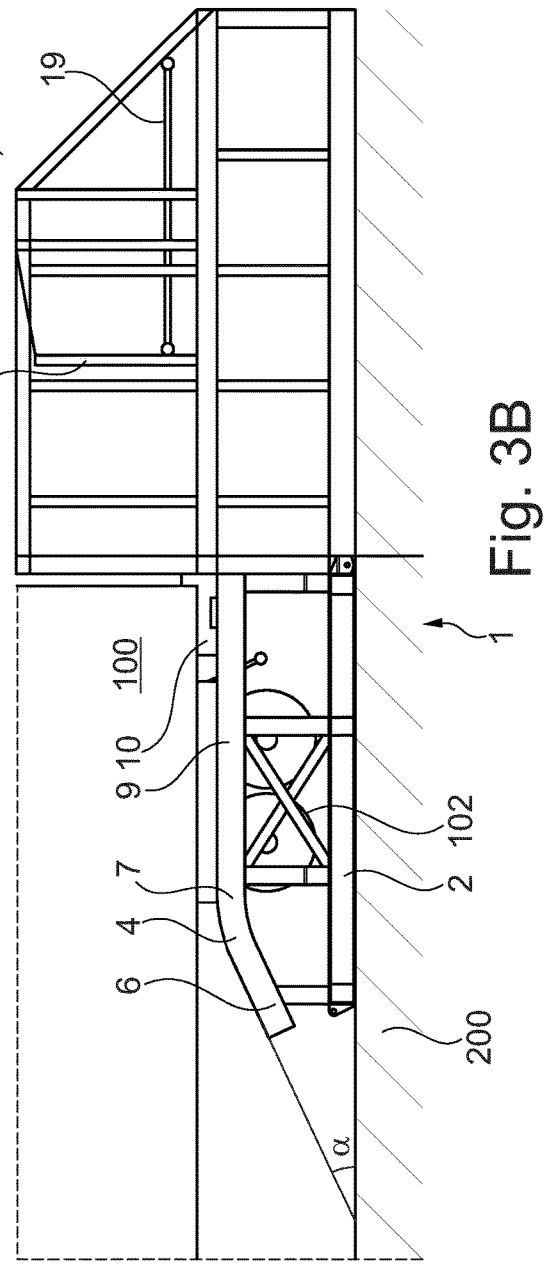

ALIGNING RAMP FOR ALIGNING A SHIPPING CONTAINER LOADED ON A VEHICLE, AND COMBINATION OF A SHIPPING CONTAINER LOADED ON A VEHICLE AND THE ALIGNING RAMP

CROSS-REFERENCE TO RELATED APPLICATIONS

This application is the United States national phase of International Application No. PCT/EP2017/052647 filed Feb. 7, 2017, and claims priority to European Patent Application No. 16156596.5 filed Feb. 19, 2016, the disclosures of which are hereby incorporated in their entirety by reference.

BACKGROUND OF THE INVENTION

Field of the Invention

The invention relates to an aligning ramp for aligning a shipping container loaded on a vehicle, the aligning ramp comprising:
a support structure;
guiding means supported by the support structure above a base plane, which guiding means comprise at least two guides arranged parallel and at a distance from each other, wherein each guide diverges relative to the base plane from a first location to a second location; and
an elongate carriage, wherein each end of the elongate carriage is guided by a guide of the guiding means.

Description of Related Art

Such an aligning ramp is known from the A2 publication of international application WO 2007/149443. The publication describes the use of an aligning ramp to vertically align a shipping container, while being loaded on a vehicle, adjacent to a loading assembly such that it can be filled by the assembly. The aligning ramp comprises two guides and a carriage running in the guides.

The vehicle with the shipping container is backed towards the aligning ramp and is connected to the ramp in cavities using connecting blocks, which are fixed to the shipping container. The guides are diverging from the surface above which the aligning ramp is arranged, and as a consequence of the connection of the shipping container to the guides through the carriage, the shipping container is shifted and thereby aligned along the path of the guide when the shipping container is further backed.

The aligning ramp according to WO 2007/149443 requires relatively precise maneuvering of the vehicle and the shipping container to properly the connecting blocks, which may be a lengthy and inefficient process. It also requires each of the shipping containers to be used in combination with the aligning assembly to be provided with connecting blocks, which is costly, and may also provide a safety risk due to protruding parts. In addition, this aligning ramp may only be used for shipping containers with a relatively small variety of widths, since too small or too large containers may not be able to reach both of the cavities in the carriage at the same time or may even cause damage to the aligning ramp.

It is thus an object of the invention to alleviate or even obviate the above-mentioned disadvantages.

SUMMARY OF THE INVENTION

This object is achieved by an aligning ramp comprising connecting means arranged in longitudinal direction at a central position to the elongate carriage.

The aligning ramp according to the invention is also used to shift and thereby vertically align a shipping container loaded on a vehicle, such that it can be filled by an adjacent loading assembly when backed up along the guides of the aligning ramp. The aligning ramp also comprises two guides and a carriage running in the guides, but is, unlike the prior art, provided with connecting means in a central position to the carriage. As a consequence, less precise positioning and thus maneuvering is required and it is also no longer required to provide the shipping container with connecting blocks, since the connecting means interact with the container itself. It is also possible to use the same aligning ramp in combination with shipping containers with a larger variety of widths, since the aligning ramp no longer relies on the carriage ends for connection.

In a preferred embodiment of the aligning ramp according to the invention, the connecting means comprise a connecting plate for connecting to the bottom of a shipping container, which connecting plate is parallel to the guides and the longitudinal axis of the carriage.

Connecting means which comprise a connecting plate that connects to the bottom of a shipping container are simple and thus cheap in construction and provide a support surface for the shipping container. The connecting plate may be either flat, or L-shaped. In both cases, the connecting plate is at least partly parallel to the guides along the positions taken in the guides.

The connection of the connecting plate may be either directly to the bottom of the container itself. This is especially advantageous when the container extends from the back of the chassis of the vehicle on which the shipping container is loaded. The connection may however also be to a part of the chassis of the vehicle on which the shipping container is loaded, which part is parallel to the bottom of the shipping container.

The connecting plate may be provided with strengthening ribs on a surface opposite to the surface connecting to the shipping container. The strengthening ribs preferably extend perpendicular to the longitudinal axis of the carriage.

In a further preferred embodiment of the aligning ramp according to the invention, the connecting plate is provided with an abutment wall arranged perpendicular to the connecting plate and parallel to the longitudinal axis of the carriage.

The abutment wall enhances the grip and facilitates a tilting movement of the shipping container towards the connecting plate parallel to the guides. In another preferred embodiment of the aligning ramp according to the invention, each guide comprises a guide rail, preferably with a C-shaped cross-section, and each end of the elongate carriage is provided with at least one roller for running on the corresponding guide rail.

Guides comprising guide rails are reliable and cheap and may be easily integrated in a support structure of the aligning ramp. Guide rails with a C-shaped cross-section have the advantage that the roller may be largely covered and thereby protected in the guide rail, while the axle of the roller extends through the opening in the C-shape to connect the roller to the other parts of the carriage.

In yet another preferred embodiment of the aligning ramp according to the invention, the at least two guides are provided beyond the second location with a guide part parallel to the base plane.

The provision of the guides with a guide part lengthens the path of the guide with a part parallel to the base plane and ensures proper vertical alignment of the shipping container adjacent to for instance a loading assembly, and thereby eases the insertion of a pusher plate of such a loading assembly.

In even another preferred embodiment of the aligning ramp according to the invention, the at least two guides have a linear gradient between the first and second location.

A linear gradient of the guides ensures a smooth, uniform and stable shifting of the shipping container on the aligning assembly.

In again another preferred embodiment of the aligning ramp according to the invention, the angle between the base plane and the at least two guides having a linear gradient is between 20° and 30°, preferably 25°.

When the gradient between the first and the second location is linear, it is important that the angle is not chosen too low, since it increases the length of the aligning ramp in order to achieve the desired alignment. On the other hand, an angle which is too high results in instability of the shipping container on the ramp and the requirement of high efforts to push the shipping container upward along the ramp. It has been found that the aligning ramp is both stable, easy to use and relatively compact by choosing the angle the gradient and the base plane between 20° and 30°, and preferably 25°.

Another preferred embodiment of the aligning ramp according to the invention, further comprises a loading assembly arranged to the support structure in line with the guide means on the side of the second and third locations, which loading assembly comprises a pusher plate movable in a direction perpendicular to the longitudinal axis of the carriage.

Such loading assemblies which are used for loading the aligned shipping container with bulk material, of which examples are known from for instance WO 2007/149443 A2, but also from US 2011/182705 A1 or GB 2451631 A, transport a significant load over a significant distance which is most often at least equal to the length of the shipping container connected to it. Integration of the aligning ramp with the loading assembly in general increases the stability of the loading assembly, due to the weight of the shipping container supported on the aligning ramp. The bulk material may for instance be waste.

In general, in each of the embodiments of the aligning ramp, the support structure is preferably supported on the lower floor and may comprise a tube frame. The tube frame preferably comprises a flat bottom plate, lying in the base plane, for maximum support.

The guides are preferably provided with blocking means in order to prevent the carriage from running off the guides. These blocking means may comprise end stops arranged adjacent to at least one extremity of the guides.

In a further preferred embodiment of the aligning ramp, the aligning ramp further comprises at least one auxiliary connection block with a connection pin for attaching to twistlock attachment points on a container, which connection block is moveably arranged along the carriage.

This allows for easy additional securing of the container to the aligning ramp. This is especially beneficial in situations where the container does not extend at the back from the chassis of the vehicle if the chassis itself does not provide sufficient strength for attachment.

The invention further relates to a combination of a shipping container loaded on a vehicle and an aligning ramp according to the invention, wherein the connecting means of the loading ramp are connected to the bottom of the shipping container.

BRIEF DESCRIPTION OF THE DRAWINGS

These and other features of the invention will be elucidated in conjunction with the accompanying figures.

FIGS. 3A and 3B show side views of the embodiment according to FIG. 1 in combination with a shipping container loaded on a vehicle.

DESCRIPTION OF THE INVENTION

Figure 1:
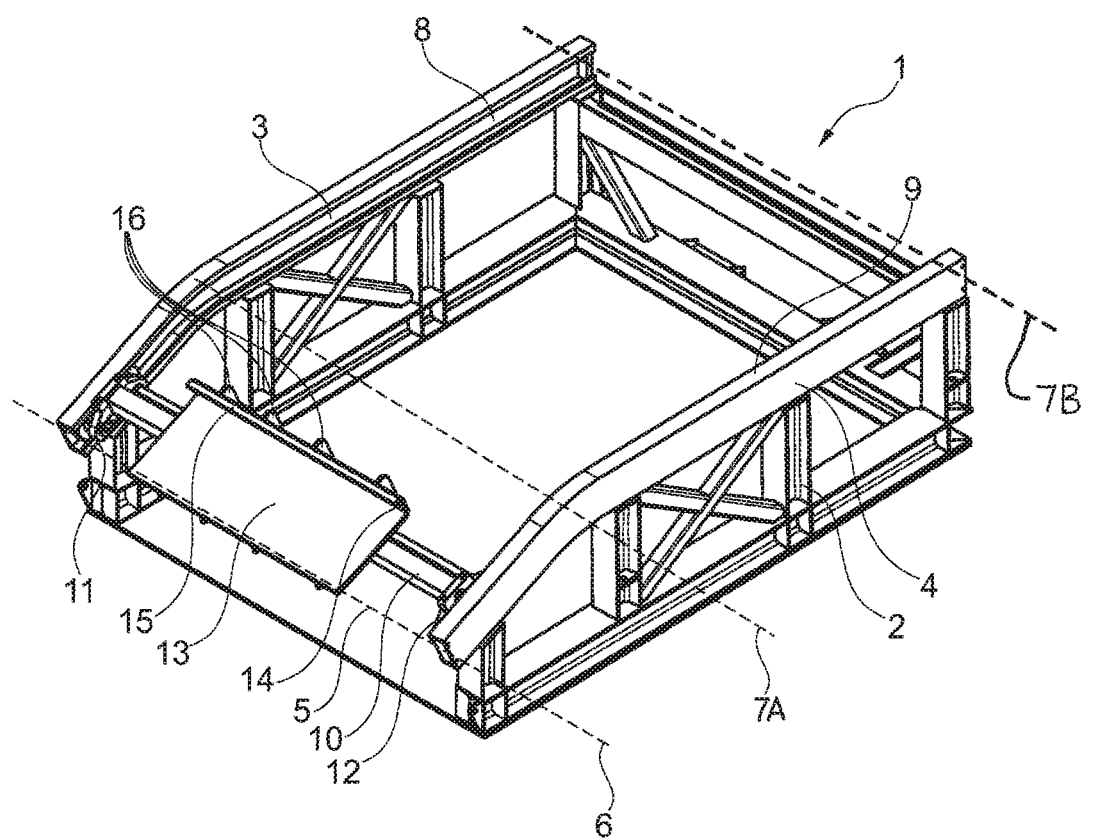
FIG. 1 shows a first perspective view of a first embodiment of an aligning ramp according to the invention with the carriage arranged in the first position of the guiding means.

FIG. 1 shows a first embodiment of an aligning ramp 1 according to the invention which may be used to vertically align a shipping container. The aligning ramp 1 comprises a support structure 2 and two guiding rails 3, 4 facing each other with their open ends, at a distance of each other, which are fixed to and supported by the support structure 2. The guiding rails 3, 4 are arranged above and at a distance of a base plane 5. The guiding rails 3, 4 diverge with a linear gradient relative to the base plane 5 from a first location 6 to a second location 7A. The guiding rails 3, 4 from the second location 7A to a third location 7B each comprise guide parts 8, 9, parallel to the base plane 5 beyond the second location 7A.

An elongate carriage 10 extends between the guiding rails 3, 4. The elongate carriage 10 comprises two sets 11, 12 of rollers, running on the respective guide rails 3, 4. The carriage 10 is provided with an L-shaped connecting plate 13, 14 comprising a first leg 13 which is parallel to the guide rails 3, 4 and the longitudinal axis of the carriage 10, as well as a second leg 14, perpendicular to the first leg 13 and parallel to the longitudinal axis of the carriage 10. The second leg 14 is provided with an abutment wall 15, extending from the second leg 14 towards the shipping container, parallel to the first leg 13. The connecting plate 13, 14, 15 may connect to the bottom of a shipping container (as shown in FIGS. 3A and 3B). Also, as illustrated in FIG. 1, the width of the connecting plate 13, 14 is less than the distance between the two parallel plates 3, 4.

Figure 2:
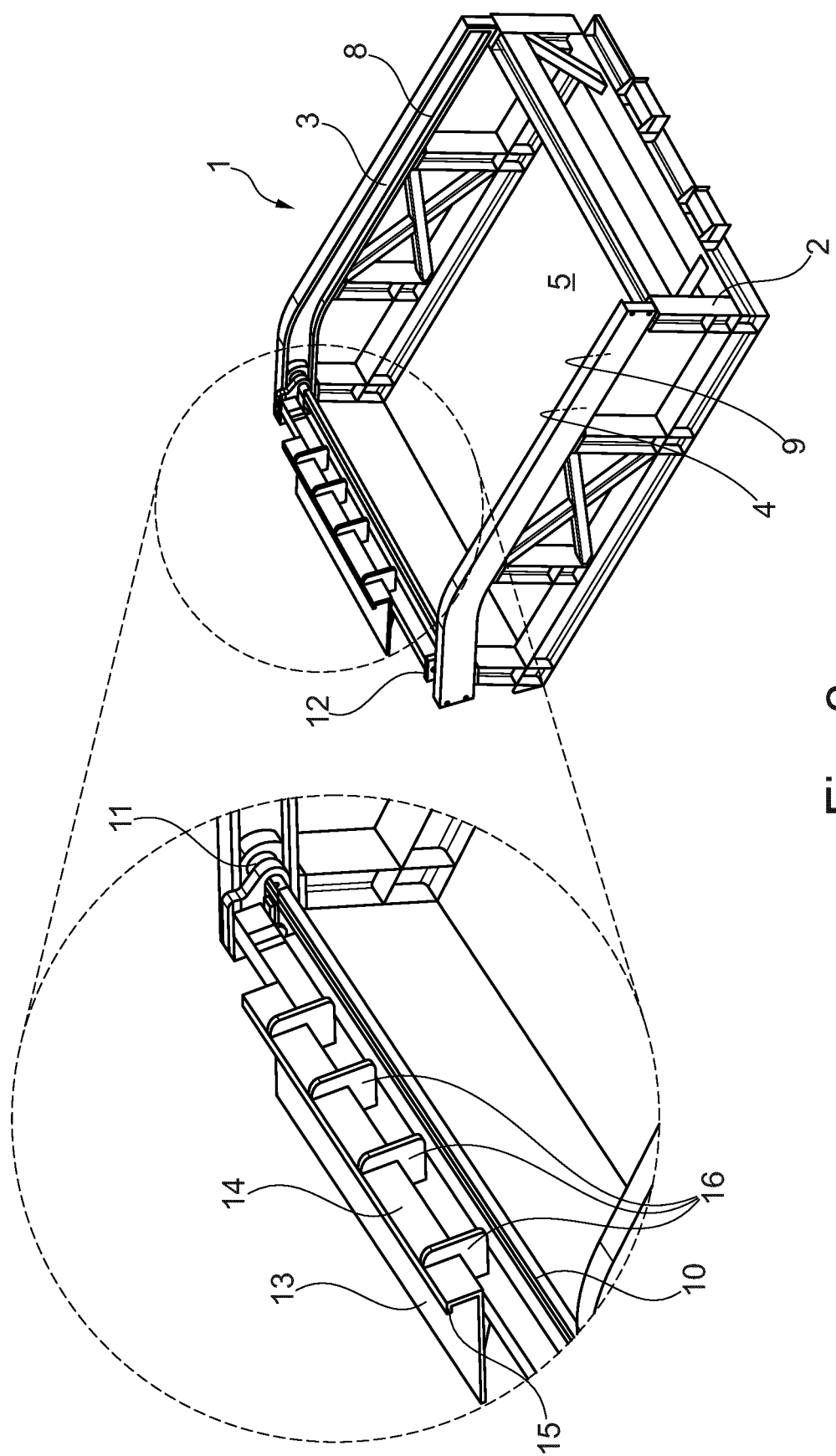
FIG. 2 shows a second perspective view of the embodiment according to FIG. 1.

FIG. 2 shows another perspective view of the aligning ramp 1 and a detail of this perspective view. From FIG. 2, it is also clear that the connecting plate 13, 14 is provided with ribs 16, extending over the back of the legs 13, 14 of the connecting plate that connects to the shipping container.

FIGS. 3A and 3B shows the aligning ramp 1 which is fixed to a loading assembly 17. The loading assembly 17 is provided with a pusher plate 18, driven by a cylinder 19, movable in a direction perpendicular to the longitudinal axis of the carriage 10.

FIG. 3A shows the aligning ramp 1 with a shipping container 100, loaded on a chassis 101 of a vehicle with wheels 102, in an unaligned position. The body of the shipping container 100 approaches the connecting plate 13, 14. When the container 100 is backed up further, the connecting plate 13, 14 connects to the bottom of the container 100, and, because of the connection of connection plate 13, 14 with the guides 3, 4 through carriage 10 and roller sets 11, 12, the container 100 will shift towards a position shown in FIG. 3B, in which the container 100 is shifted and aligned to the loading assembly 17, whereas the wheels 102 and the chassis are suspended in the ramp 1, at a distance from the floor 200.

It can also be seen from FIG. 3B that the angle α between the base plane 5, which coincides with the floor 200, and the two guides 3, 4 is 25°.

Figure 4:
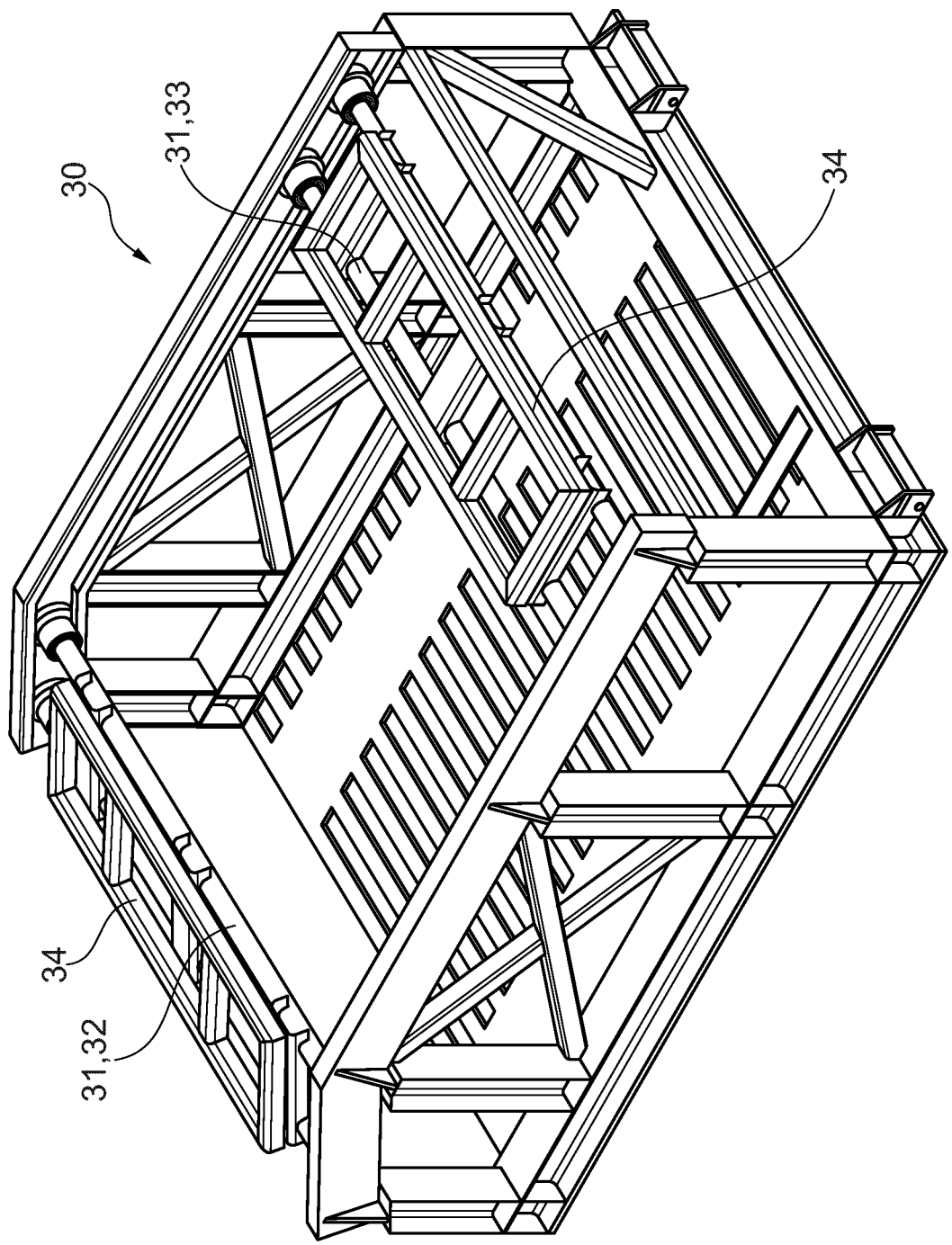
FIG. 4 shows a perspective view of a second embodiment of an aligning ramp according to the invention showing the carriage in both the first position and a position beyond the second position of the guiding means.

An alternative embodiment of an aligning ramp 30 is shown in FIG. 4. In this figure, the range of motion of the carriage 31 is shown, i.e. the carriage 31 is shown in the same figure in both extreme positions 32, 33. The present embodiment 30 is similar to the first embodiment 1, but, inter alia, has a carriage 31 which is only provided with an open connecting plate 34 which lacks an abutment wall.

Figure 5A:
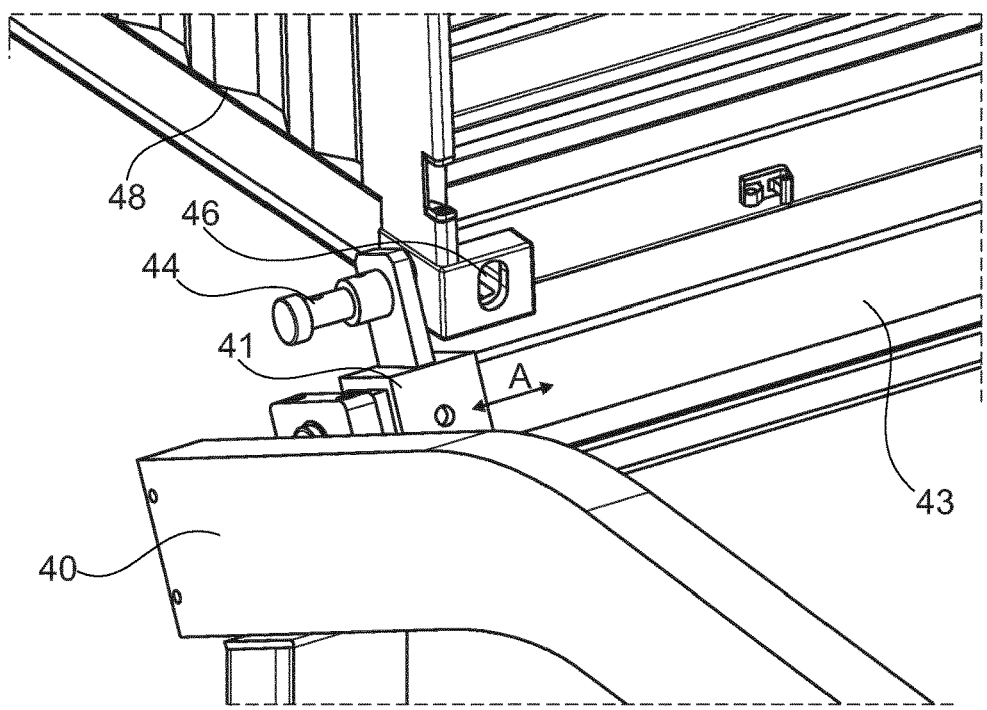
FIGS. 5A, 5B and 5C show perspective views of a third embodiment of an aligning ramp according to the invention showing the carriage in the first position of the guiding means.
Figure 5B:
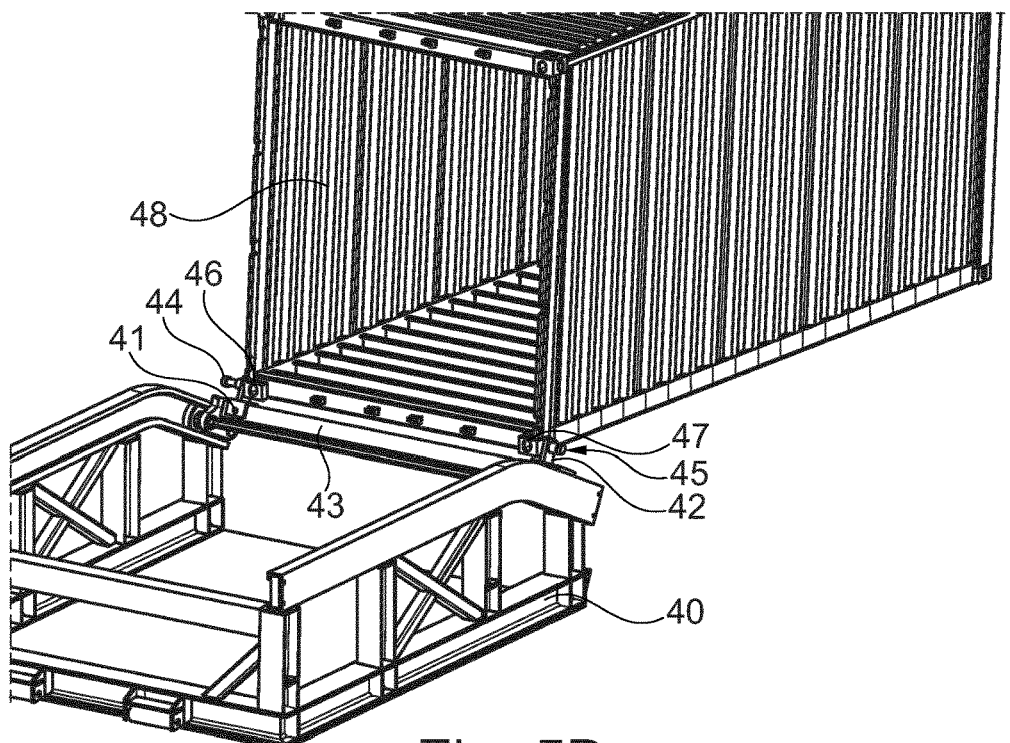
Figure 5C:
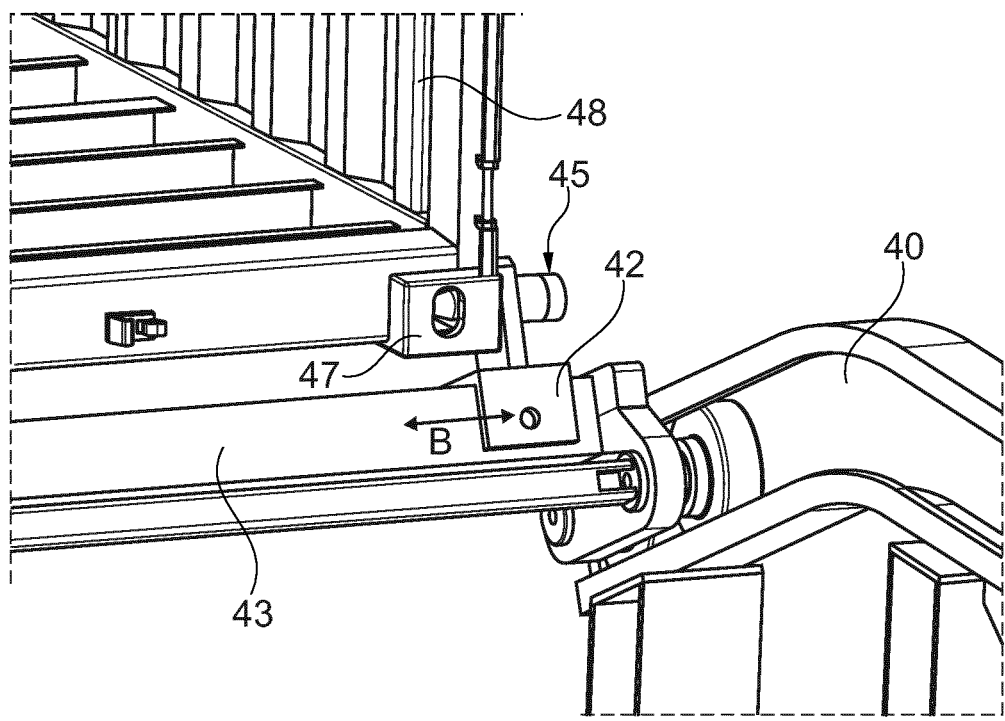

Another alternative embodiment of an aligning ramp 40 is shown in FIGS. 5A, 5B and 5C. In the embodiment in these figures, the aligning ramp 40 comprises two auxiliary connection blocks 41, 42, moveable in direction A, B along a connecting beam 43, around which the blocks 41, 42 are mounted. Both connection blocks 41, 42 comprise a pin 44, 45 attachable to twistlock attachment points 46, 47 on the edges of container 48 and thus serve as an additional safeguard for securing the container 48 on the ramp 40.

The invention claimed is:

1. An aligning ramp for aligning a shipping container loaded on a vehicle, the aligning ramp comprising:
   a support structure;
   guiding means supported by the support structure above a base plane, which guiding means comprise at least two guides arranged parallel and at a distance from each other, wherein each guide diverges relative to the base plane from a first location to a second location, wherein from the second location to a third location each guide is parallel to the base plane;
   an elongate carriage, wherein each end of the elongate carriage is guided by a guide of the guiding means, and
   connecting means comprising a connecting plate arranged in a longitudinal direction at a central position to the elongate carriage: wherein the width of the connecting plate is less than the distance between the two parallel guides.

2. The aligning ramp according to claim 1, wherein the connecting plate is adapted to connect to the bottom of a shipping container, which connecting plate moves in a direction parallel to the guides and the longitudinal axis of the carriage.

3. The aligning ramp according to claim 2, wherein the connecting plate is provided with an abutment wall arranged perpendicular to the connecting plate and parallel to the longitudinal axis of the carriage.

4. The aligning ramp according to claim 3, wherein each guide comprises a guide rail and wherein each end of the elongate carriage is provided with at least one roller for running on the corresponding guide rail.

5. The aligning ramp according to claim 3, wherein the at least two guides have a linear gradient between the first and second locations.

6. The aligning ramp according to claim 2, wherein each guide comprises a guide rail and wherein each end of the elongate carriage is provided with at least one roller for running on the corresponding guide rail.

7. The aligning ramp according to claim 2, wherein the at least two guides have a linear gradient between the first and second locations.

8. The aligning ramp according to claim 1, wherein each guide comprises a guide rail and wherein each end of the elongate carriage is provided with at least one roller for running on the corresponding guide rail.

9. The aligning ramp according to claim 8, wherein the at least two guides have a linear gradient between the first and second locations.

10. The aligning ramp according to claim 1, wherein the at least two guides have a linear gradient between the first and second location.

11. The aligning ramp according to claim 10, wherein the angle between the base plane and the at least two guides having a linear gradient is between 20° and 30°.

12. The aligning ramp according to claim 10, wherein the angle between the base plane and the at least two guides having a linear gradient is 25°.

13. The aligning ramp according to claim 1, further comprising a loading assembly arranged to the support structure in line with the guide means on the side of the second location, which loading assembly comprises a pusher plate movable in a direction perpendicular to the longitudinal axis of the carriage.

14. The combination of a shipping container loaded on a vehicle and an aligning ramp according to claim 1, wherein the connecting means of the loading ramp are connected to the bottom of the shipping container.

* * * * *